(12) United States Patent
Ricchio et al.

(10) Patent No.: US 8,090,701 B2
(45) Date of Patent: *Jan. 3, 2012

(54) APPARATUS AND SYSTEM FOR COMMUNICATING WITH MULTIPLE DATA STORES

(75) Inventors: Francis Joseph Ricchio, San Jose, CA (US); Judy Y. Tse, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 448 days.

This patent is subject to a terminal disclaimer.

(21) Appl. No.: 12/275,122

(22) Filed: Nov. 20, 2008

(65) Prior Publication Data

US 2009/0138485 A1     May 28, 2009

Related U.S. Application Data

(63) Continuation of application No. 10/870,294, filed on Jun. 17, 2004, now Pat. No. 7,472,124.

(51) Int. Cl.
*G06F 17/30* (2006.01)
(52) U.S. Cl. .......................... 707/705; 707/821
(58) Field of Classification Search .................. 707/705, 707/821
See application file for complete search history.

(56) References Cited

U.S. PATENT DOCUMENTS

| 5,463,736 | A |   | 10/1995 | Elko et al. |
| 5,465,359 | A |   | 11/1995 | Allen et al. |
| 5,506,984 | A | * | 4/1996  | Miller ................................ 1/1 |
| 5,539,893 | A | * | 7/1996  | Thompson et al. ........... 711/122 |
| 5,606,693 | A |   | 2/1997  | Nilsen et al. |
| 5,706,432 | A |   | 1/1998  | Elko et al. |
| 5,721,914 | A |   | 2/1998  | DeVries |
| 5,918,227 | A |   | 6/1999  | Polnerow et al. |
| 5,924,096 | A |   | 7/1999  | Draper et al. |

OTHER PUBLICATIONS

King, G. M., "Cluster Architectures and S/390 Parallel Sysplex Scalability," IBM Systems Journal, vol. 36 No. 2, 1997 www.research.ibm.com/journal/sj/362/king.html.

Kyne et al., "Chapter 2. High-Level Design Concepts for Parallel Sysplex," OS/390 Parallel Sysplex Configuration, vol. 1: Overview, International Technical Support Organization, pp. 71-82, www.redbooks.ibm.com, Jun. 17, 2004.

Long, Harrington, Hain, and Nicholls, "Implementation of the IMS Database Model," IMS Primer, International Technical Support Organization, Jan 2000, p. 89, www.redbooks.ibm.com.

* cited by examiner

*Primary Examiner* — Thu-Nguyet Le
(74) *Attorney, Agent, or Firm* — Kunzler Needham Massey & Thorpe

(57) ABSTRACT

An apparatus and system are disclosed for communicating with multiple data stores. The present invention includes a control module that communicates with a plurality of data stores. The control module is in communication with a connection module. The connection module communicates with a first association module that is in communication with a first data store. The control module communicates with the first data store through the connection module and the first association module. In addition, the first association module communicates with a second association module. The second association module communicates with a second data store. The control module also communicates with the second data store through the connection module, the first association module, and the second association module.

14 Claims, 6 Drawing Sheets

APPARATUS AND SYSTEM FOR COMMUNICATING WITH MULTIPLE DATA STORES

CROSS-REFERENCES TO RELATED APPLICATIONS

This application is a continuation of and claims priority to U.S. patent application Ser. No. 10/870,294 entitled "METHOD FOR COMMUNICATING WITH MULTIPLE DATA STORES" and filed on Jun. 17, 2004 for Francis J. Ricchio et al., which is incorporated herein by reference.

BACKGROUND OF THE INVENTION

1. Field of the Invention

This invention relates to communicating with multiple data stores and more particularly relates to communicating with multiple data stores through a single connection module.

2. Description of the Related Art

Data processing systems often store and retrieve data in data stores using a coupling facility. The coupling facility is a shared data storage device and is often a shared cache. Data stores include databases, data files, and other organized data. Data processing systems typically access the data store in the coupling facility through a communication channel. Generally, the data processing system addresses each data store through a separate physical communication channel.

The coupling facility typically organizes each data store in a separate coupling facility structure. Each coupling facility structure is configured for communication through a communication channel with a data processing system. Often, each data store must be accessed through a separate communication channel between the coupling facility and one or more data processing systems. For example, accessing three data store requires three physical communication channels between the coupling facility and a data processing system as the data processing system can only address a single data store through each communication channel.

Unfortunately, the number of data stores in the coupling facility that must be accessed by the data processing system often exceeds the number of available communication channels. Consequently, one or more data processing systems are unable to access data stores. In addition, a conventional coupling facility structure just supports a single data store. This restriction is generally present simply because the data processing system is configured to address a single data store over a single dedicated physical communication channel.

FIG. 1 is a schematic block diagram illustrating one embodiment of a conventional data store management system 100. One or more data processing systems 120 may communicate through an interconnection facility 140 to one or more single management structures 160 of a coupling facility 150. The interconnection facility 140 provides communication channels. The coupling facility 150 is a shared data storage device 150. Each single management structure 160 contains one data store 180.

A first data processing system 120a may access a first data store 180a through the interconnection facility 140 to the first data store 180a of a single management structure 160. The first data processing system 120a may also access a second data store 180b through the interconnection facility 140. Unfortunately, a separate physical communication channel of the interconnection facility 140 (represented by solid arrows) is required for accessing each data store 180. If the number of data stores 180 that must be accessed by data processing systems 120 exceeds the number of physical communication channels supported by the interconnection facility 140, some of the data stores 180 will be inaccessible until a physical communication channel becomes available.

For example, if the interconnection facility 140 included sixty-four (64) physical communications channels, the data processing systems 120 will only be able to access sixty-four (64) data stores 180 in the coupling facility 150. A data processing system 120 that needed to access a sixty-fifth data store 180 in the coupling facility 150 would be forced to wait until another physical communication channel in the interconnection facility 140 becomes free, and then access the sixty-fifth data store 180 through the freed communication channel. Additional data processing systems 120b must also wait.

From the foregoing discussion, it should be apparent that a need exists for an apparatus and system that enable communication with a plurality of data stores 180 through a single communication channel. Beneficially, such an apparatus and system would reduce the number of physical communication channels required to access the plurality of data stores 180 and allow the single management structure 160 to include one or more one data stores 180.

SUMMARY OF THE INVENTION

The present invention has been developed in response to the present state of the art, and in particular, in response to the problems and needs in the art that have not yet been fully solved by currently available data store systems. Accordingly, the present invention has been developed to provide an apparatus and system for communicating with multiple data stores that overcome many or all of the above-discussed shortcomings in the art.

The apparatus for communicating with multiple data stores is provided with a logic unit containing a plurality of modules configured to functionally execute the necessary steps of communicating with a plurality of data stores. These modules in the described embodiments include a control module, a first connection module, a first association module, and a second association module.

The control module may be incorporated with a data processing system. For example, the control module may comprise one or more control blocks of the operating system of the data processing system. The control module communicates with the first connection module. The first connection module may include a single physical communication channel between the control module and the single management structure.

The single management structure stores and retrieves a plurality of data stores. The single management structure may be a coupling facility structure of a coupling facility. The coupling facility is a shared data storage device. In one embodiment, the coupling facility structure comprises a shared cache.

The first connection module communicates with the first association module. The first association module communicates with a first data store of the single management facility. Together the first association module and first connection module cooperate such that the control module can access a single data store as in conventional systems. The control module accesses the first data store through the first connection module and the first association module. In addition, the first association module also communicates with a second association module. The second association module communicates with a second data store of the single management facility. The first association module and second association module cooperate to fulfill data request from the control module to a second data store. The control module accesses the second data store through the first connection module, the first association module, and the second association module, preferably in that order.

In one embodiment, each association module resides in a data processing system such as the data processing system that includes the control module. Each association module may be implemented as a linked array. Alternatively, a cross system operating system of the data processing system may include the association module. In a certain embodiment, the first and second association modules reside in the coupling facility. Each association module includes one or more logical data structures for managing physical and logical communication between a data store and the control module.

The control module may maintain one or more data structures that define logical connections between the first and second data stores through the first connection module and the first and second association modules. In one embodiment, the control module communicates with a second connection module through the first connection module. The second connection module may provide a physical communication channel between the control module and a third data store in another coupling facility. The second connection module communicates through a third association module with the third data store. The control module may access the third data store through the first connection module, the second connection module, and the third association module, again preferably in that order.

A method of the present invention is also presented for managing multiple data stores. The method in the disclosed embodiments substantially includes the steps necessary to carry out the functions presented above with respect to the operation of the described apparatus. In one embodiment, the method establishes communications between a control module of a data processing system and a first connection module. The method further includes establishing communications between the first connection module and a first association module in communication with a first data store. The control module accesses the first data store through the first connection module and the first association module. The method also establishes a logical connection between the first association module and a second association module in communication with a second data store. The control module accesses the second data store through the first connection module, the first association module, and the second association module.

In one embodiment, the method establishes communications between the first connection module and a second connection module. The second connection module may further establish communications with a third association module. The second connection module may reside on a second coupling facility. The third association module accesses a third data store. The control module may access the third data store through the first connection module, the second connection module, and the third association module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention allows a control module to access a plurality of data stores through a single connection module and one or more association modules. The present invention may reduce the physical communication channels required to manage and access the plurality of data stores and allow a single management structure to include two or more data stores. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
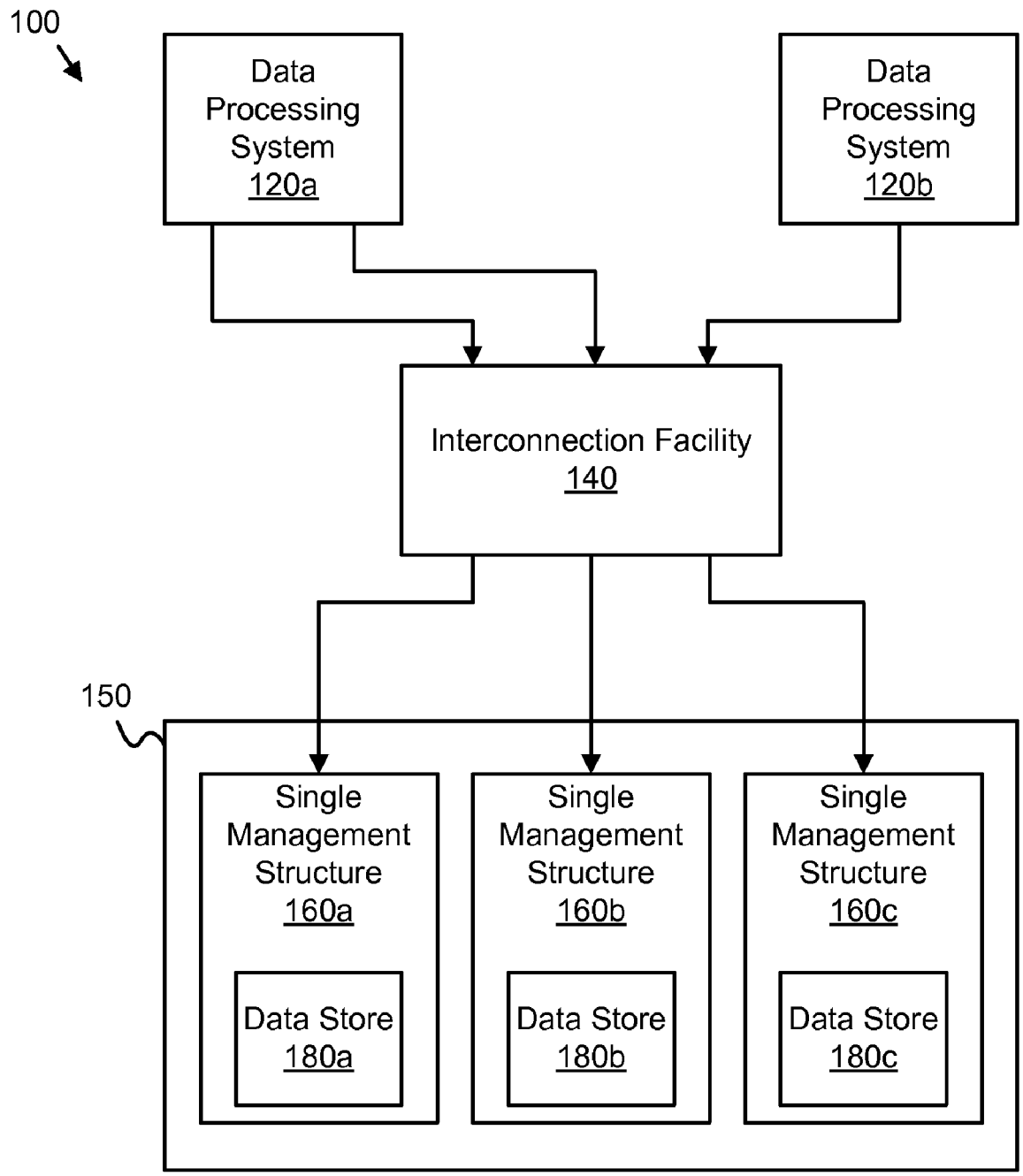
FIG. 1 is a schematic block diagram illustrating one embodiment of a conventional data store management system.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 2:
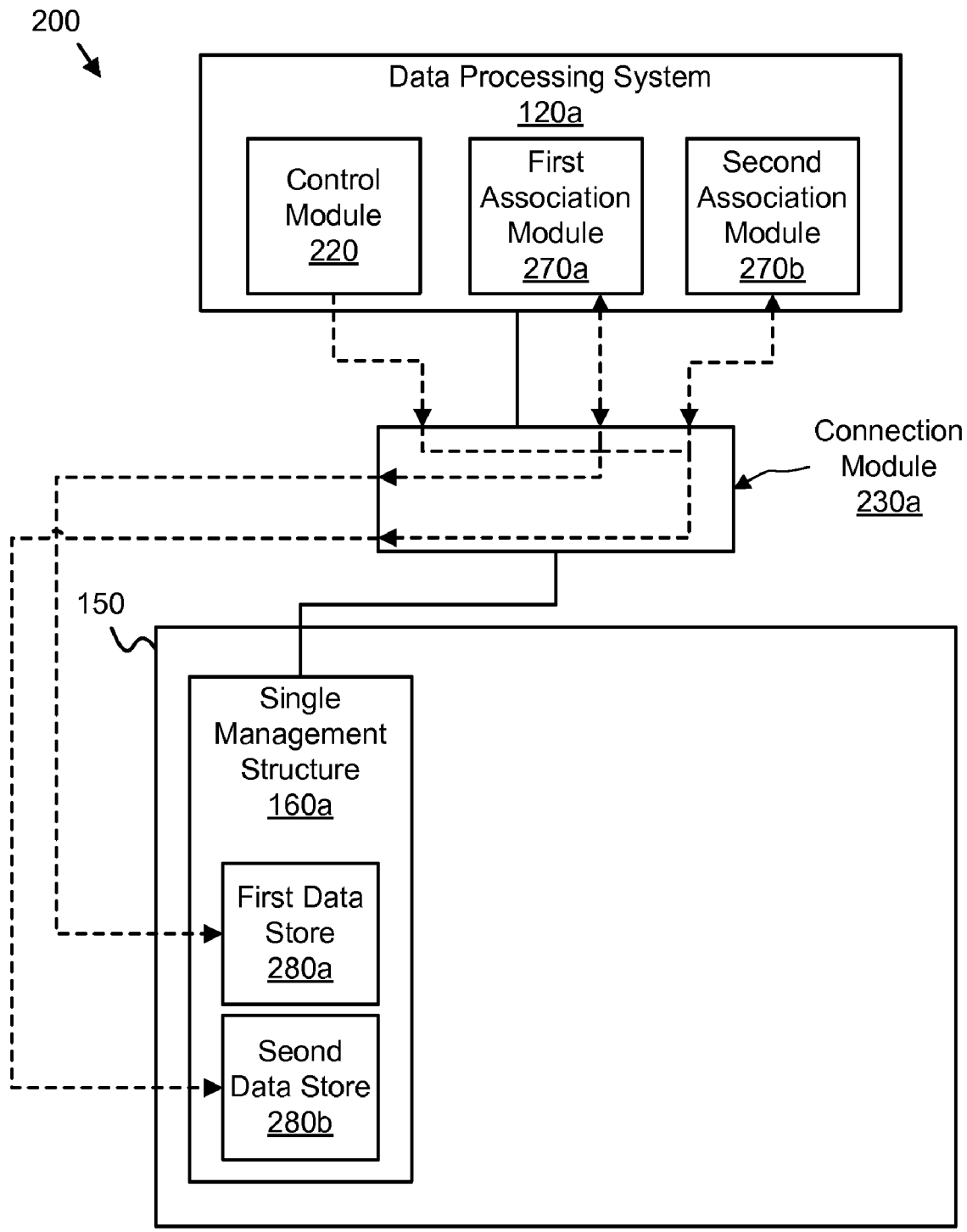
FIG. 2 is a schematic block diagram illustrating one embodiment of a data store management system in accordance with the present invention.

FIG. 2 is a schematic block diagram illustrating one embodiment of a data store management system 200 of the present invention. The data store management system 200 manages and accesses one or more data stores 280. The data store management system 200 includes one or more data processing systems 120, one or more association modules 270, a control module 220, a connection module 230, a coupling facility 150, one or more single management structures 160, and one or more data stores 280.

The coupling facility 150 is a shared data storage device. In one embodiment, the coupling facility 150 may be a shared cache. The coupling facility 150 includes at least one single management structure 160. The single management structure 160 may comprise a coupling facility cache structure of the coupling facility 150. The single management structure 160 is used to store and retrieve data from a plurality of data stores 280. The data stores 280 may be databases, data structures, and the like.

The data processing system 120 accesses the data stores 280 for storing and retrieving data. To access the data stores 280, the data processing system 120 requires at least one physical communication channel to the single management structure 160 (represented by solid lines.) For example, as discussed in the FIG. 1, access to the coupling facility 150 may be through a limited number of physical communication channels. If the control module 220 is only able to access one data store 280 through each physical communications channel, the number of data stores 280 the control module 220 can access is limited to the number of physical communications channels. However, the data store management system 200 manages and accesses one or more data stores 280 through each physical communication channel, allowing the data processing system 120 to access a number of data stores 280 in excess of the number of available physical communication channels.

The control module 220 provides access to the plurality of data stores 280 for the data processing system 120. The control module 220 may establish communications with the first connection module 230a. In one embodiment, communications may be established by the control module 220 passing a software pointer to the first connection module 230a through a shared memory in the memory location of the data processing system 120. The software pointer may reference a plurality of data values. The control module 220 may communicate logical or physical data store 280 addresses to the first connection module 230a through the software pointer data values. The control module 220 and the first connection module 230a may also communicate data to and from a data store 280 through the data values referenced by the software pointer. The first connection module 230 may then pass the data along to enable access to a data store 280.

In one embodiment, the first connection module 230a includes a single physical communications channel between the control module 220 and the single management structure 160a. The physical communications channel may comprise a fiber optic connection between the data processing system 120a and the coupling facility 150.

In the depicted embodiment, each association module 270 resides in the data processing system 120. Alternatively, the association module 270 may reside in the coupling facility 150 or connection module 230.

In one embodiment, each association module 270 comprises a linked array. The linked array comprises a plurality of data structures linked by software pointers in each data structure referencing one or more other data structures. Each association module 270 comprises data describing the single management structure 160a. Each linked array may include data values such as look-up translation values. The translation values may be tokens referencing each unit of data in the data stores 280. The first association module 270a communicates with a first data store 280a of the single management structure 160a and communicates with the control module 220 through the first connection module 230a.

For example, the control module 220 may pass a software pointer to data values comprising a data request for data from the first data store 280a. The first connection module 230a may employ the location information such as translation values of the linked array of the first association module 270a to translate a logical address in the data request to a token representing the a physical location of the requested data in the first data store 280a and direct the data request data values including the physical location over the physical communications channel to the single management structure 160a. The single management structure 160a transmits the requested data over the single physical communications channel to the first connection module 230a which routes the data to the control module 220 using the data values of one or more arrays of the first association module 270a.

In this manner, the control module 220 communicates with a single connection module 230 as in conventional systems but references to the first data store 280 are not dependent on the physical communication channel. Instead, the connection module 230 and first association module 270a cooperate to provide a logical data path to the first data store 280. The logical data path is decoupled from the physical communication path. The logical data path also allows the control module 220 to address second and third data stores over the same physical communication path using a second associate module 270b.

The second association module 270b communicates through the first association module 270a and the first connection module 230a with the control module 220. The second association module 270b also communicates with a second data store 280b. The control module 220 manages and access the first data store 280a and the second data store 280b through the first connection module 230a and the first and second association modules 270a, 270b. The data processing system 120a accesses both the first data store 280a and the second data store 280b of the coupling facility 150 through the control module 220, the connection module 230, and the first and second association modules 270a, 270b. The association modules 270 may alternatively reside in the coupling facility 150. The data store management system 200 supports access to one or more data stores 280 through a control module 220, a connection module 230, and one or more association modules 270.

Figure 3:
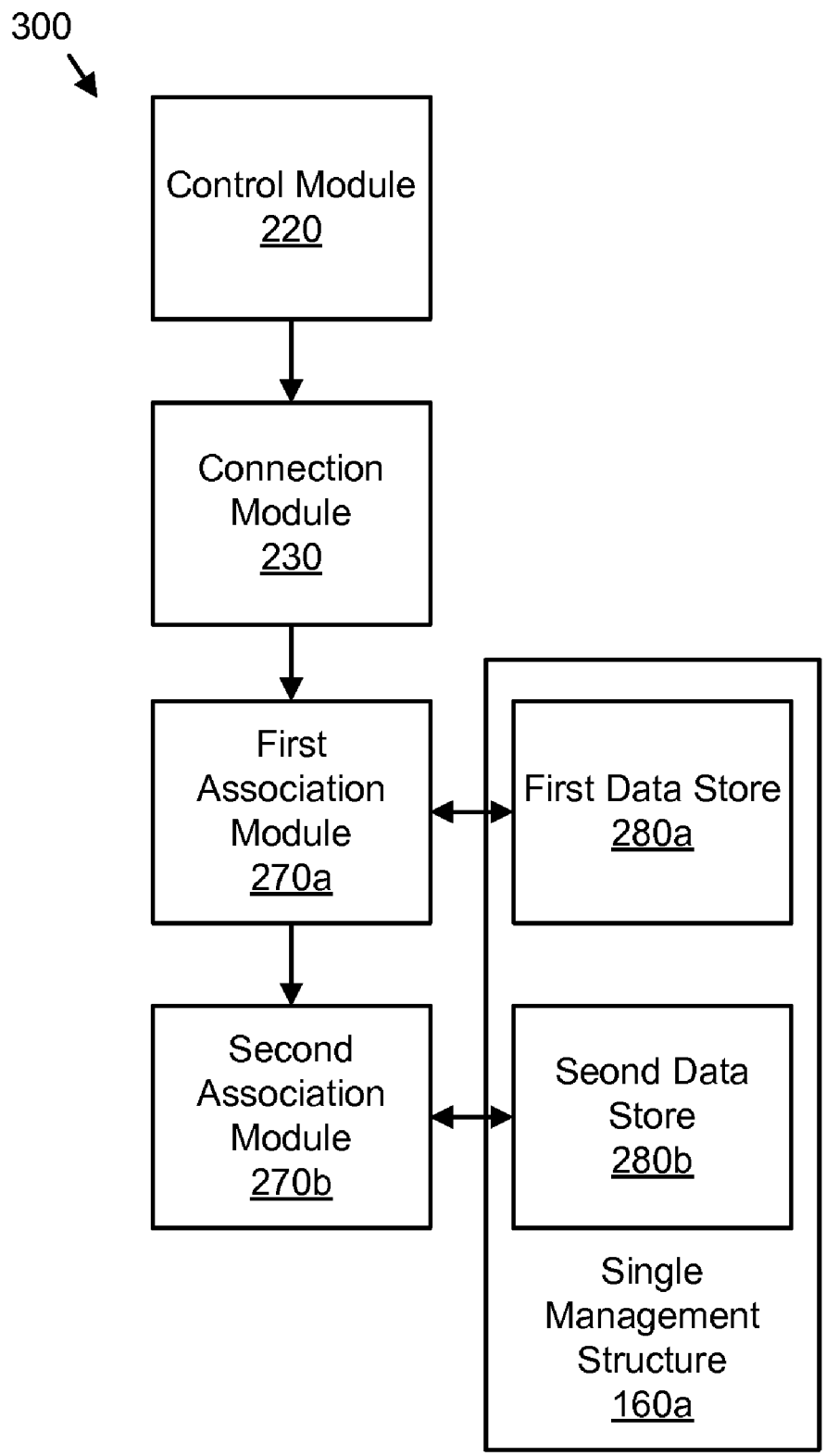
FIG. 3 is a schematic block diagram illustrating one embodiment of a data store management apparatus of the present invention.

FIG. 3 is a schematic block diagram illustrating one embodiment of a data store management apparatus 300 of the present invention. The data store management apparatus 300 communicates with a plurality of data stores 280 through a control module 220 in communication with a connection module 230 and a plurality of association modules 270. Although the depicted data store management apparatus 300 includes two association modules 270 and two data stores 280, any number of association modules 270 and data stores 280 may connect to the connection module 230.

Preferably, for each data store 280 there is an associated association module 270. The association modules 270 communicate through each other to a single connection module 230. Additional association modules 270 communicate with control module 220 simply by linking to the most recently created association module 270. For example, a third association module 270 linked to a third data store 280 of the single management structure 160 may be linked to the second association module 270. In this manner, the control module 220 can communicate with many data stores 280 using a single connection module 230.

The control module 220 communicates with the connection module 230. The control module 220 may include control blocks of an operating system such as the Cross System Operating System ("XES") for z/OS, manufactured by International Business Machines ("IBM") of Armonk, N.Y. In a certain embodiment, the control blocks of the control module 220 may be configured to communicate with a single logical module such as the connection module 230.

In one embodiment, the control module 220 establishes the connection module 230. For example, the control module 220 may allocate one or more physical communication channels and allocate one or more logical data structures to the connection module 230 and spawn a connection module 230 process. The physical communication channels may include point-to-point electrical data channels, a switched matrix of connections, point-to-point optical data channels, and shared electrical data buses.

The connection module 230 communicates with the first association module 270a. The first association module 270a communicates with a first data store 280a. The control module 220 accesses the first data store 280a through the connection module 230 and the first association module 270a. The first association module 270a may also communicate with the second association module 270b, and the second association module 270b communicates with a second data store 280b. The control module 220 accesses the second data store 280b through the connection module 230, the first association module 270a, and the second association module 270b.

The control module 220 may communicate a data request to the connection module 230. The data request includes location information such as a logical address for locating the requested data. In one embodiment, the location information logically identifies a particular association module 270ab. The connection module 230 communicates the data request to the specified association module 270 associated with a desired data store 280 for satisfying the data request.

For example, the control module 220 may communicate a data retrieval request to the connection module 230 specifying data from the second data store 280b. The connection module 230 identifies the second data store 280b from the location information of the data retrieval request and communicates the data retrieval request to the first association module 270a. The connection module 230 may identify the second data store 280b by using the location information of the data retrieval request to retrieve the desired data. In an alternate example, the connection module 230 may employ the translation values of the first association module 270a to access the translation values of the second association module 270b. The translation values of the second association module 270b are used to direct the data request to the second data store 280b. The second data store 280b communicates the requested data to the control module 220 using the translation values and shared memory communications of the second association module 270b, first association module 270a, and connection module 230.

The first association module 270a also identifies the second data store 280b from the location information of the data retrieval request and communicates the data request to the second association module 270b. The first association module 270a may identify the second data store 280b by using the location information of the data retrieval request to retrieve location information for the second association module 270b from the linked array of the first association module 270a. The second association module 270b receives the data retrieval request from the first association module 270a and communicates the data retrieval request to the single management structure 160a which accesses the second data store 280b.

Responsive to the data retrieval request, the single management structure 160a retrieves the specified data from the second data store 280b. In one embodiment, the single management structure 160a communicates the specified data from the second data store 280b directly to the control module 220. In an alternate embodiment, the single management structure 160a communicates the specified data to memory allocated to the second association module 270b, and the second association module 270b communicates the specified data through memory allocated to the first association module 270a and memory allocated to the connection module 230 to the control module 220.

In one embodiment, the location information of the data retrieval request includes the physical address of the specified data in the second data store 280b. In an alternate embodiment, the location information of the data retrieval request includes a logical address of the specified data. The second association module 270b may translate the logical address of the specified data into the physical address of the specified data. In a certain embodiment, the second association module 270b uses the logical representation of the address of the specified data to retrieve the physical address of the specified data from the linked array of the second association module 270b.

In an alternate example, the control module 220 communicates a data storage request to the connection module 230. The data storage request may include the data to be stored.

The connection module 230 communicates the data storage request to the appropriate module such as the first association module 270a in communication with the target data store 280. For example, the control module 220 may communicate a data storage request to the connection module 230 to store data in the first data store 280a. The connection module 230 identifies the first data store 280a from the location information of the data storage request and communicates the data storage request to the first association module 270a. The connection module 230 may identify the first data store 280a by using the location information of the data storage request to access the location information of the first association module 270a.

The first association module 270a receives the data storage request from the connection module 230. In one embodiment the first association module 270a communicates the data storage request to the single management structure 160a and first data store 280a through a communications channel. In an alternate embodiment, the connection module 230 uses the translation values of the first association module 270a to relay the data storage request to the single management structure 160a. In one embodiment, the location information of the data storage request includes the physical address for storing the specified data in the first data store 280a. In an alternate embodiment, the location information of the data storage request includes a logical address for storing the data. The first association module 270a may translate the logical address for storing the data into the physical address for storing the data. In a certain embodiment, the first association module 270a uses the logical address to retrieve the physical address from the linked array of the first association module 270a. Responsive to the data storage request, the single management structure 160a stores the data in the first data store 280a.

In one embodiment, each association module 270 resides in a data processing system 120 such as the data processing system 120 that includes the control module 220. Each association module 270 may be implemented as a linked array, and may also be included in a cross system operating system of the data processing device 120. In addition, each association module 270 includes one or more logical data structures for managing physical and logical communication with a data store 280. The control module 220 may also maintain one or more data structures that define logical connections between the first and second data stores 280a, 280b through the connection module 230 and the first and second association modules 270a, 270b. The data store management apparatus 300 allows the control module 220 to communicate with a plurality of data stores 280 through communication with a single connection module 230.

Figure 4:
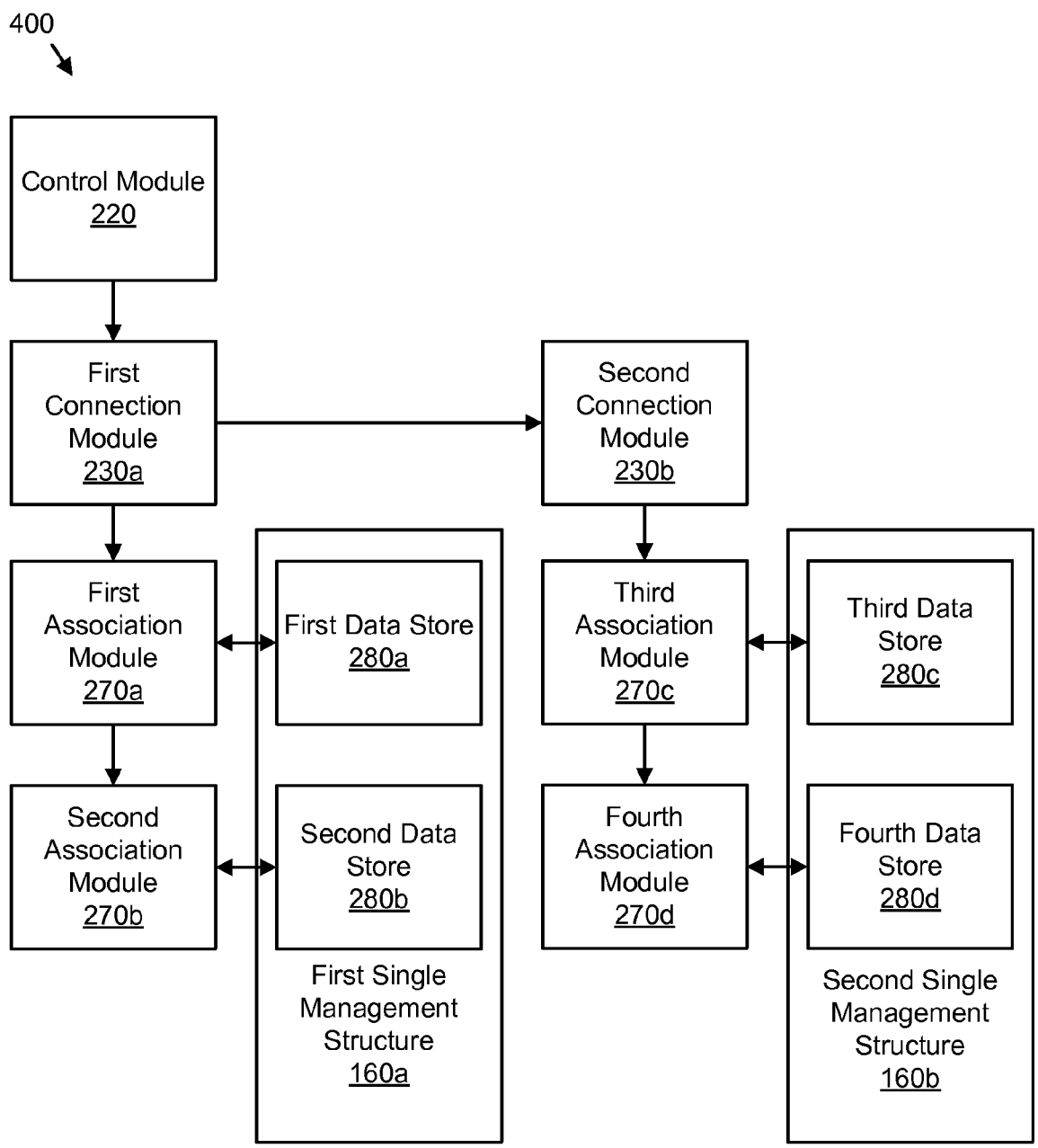
FIG. 4 is a multiple connection module data store management apparatus in accordance with the present invention.

FIG. 4 is a multiple connection module data store management apparatus 400 in accordance with the present invention. As shown in FIG. 3, the control module 220 communicates with the first and second data stores 280a, 280b of the first single management structure 160a through the first connection module 230a and the first and second association modules 270a, 270b. In addition, the control module 220 communicates with a second connection module 230b through the first connection module 230a. The second connection module 230b may include a physical communication channel to a second single management structure 160b that includes a third and fourth data store 280c, 280d. In one embodiment, the second single management structure 160b is in the coupling facility 150 (see FIG. 2) that includes the first and second data stores 280a, 280b. In an alternate embodiment, the second single management structure 160b is in a separate coupling facility (not shown). The control module 220 communicates with a third and fourth data store 280c, 280d through the second connection module 230b and the third and fourth association module 270c, 270d. The control module 220 communicates indirectly with the plurality of data stores 280, and the control module 220 communicates directly with just the first connection module 230a.

For example, the first and second data stores 280a, 280b may reside in a first coupling facility 150 (see FIG. 2) and the third and fourth data stores 280c, 280d may reside a second coupling facility (not shown). The control module 220 communicates with the first and second data stores 280a, 280b through the first connection module 230a and the first and second association modules 270a, 270b respectively and communicates with the third and fourth data stores 280c, 280d through the first connection module 230a, the second connection module 230b, and the third and fourth association modules 270c, 270d. The multiple connection module data store management apparatus 400 manages and controls a plurality of data stores 280 that may be located in physically distinct coupling facilities 150 through a plurality of connection modules 230.

The following schematic flow chart diagram is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
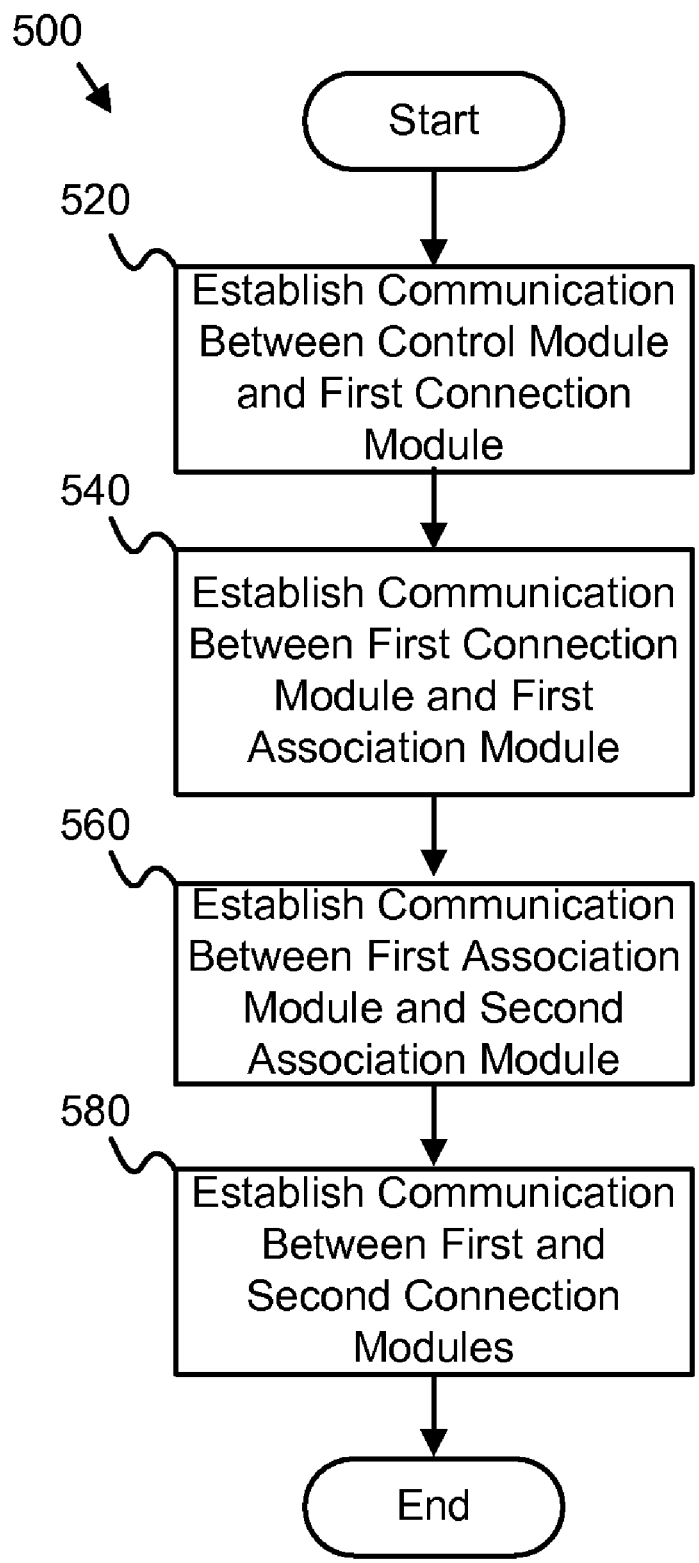
FIG. 5 is a schematic flow chart diagram illustrating one embodiment of a data store management method in accordance with the present invention.

FIG. 5 is a schematic flow chart diagram illustrating one embodiment of a data store management method 500 in accordance with the present invention. The control module 220 establishes 520 communications with the first connection module 230a. In one embodiment, the control module 220 establishes 520 communications in response to receiving a request for access to a data store 280. A data processing system 120 may initiate the request for access to the data store 280. In one embodiment, a cross system operating system receives the request for access to the data store 280 and establishes the control module 220 and the first connection module 230a to facilitate the access.

The first connection module 230a establishes 540 communications with the first association module 270a. The first association module 270a is in communication with the first data store 280a. In a certain embodiment, the control module 220 establishes an association module 270 such as the first association module 270a. In an alternate embodiment, the coupling facility 150 establishes an association module 270 such as the first association module 270a in response to an initial communication request. The control module 220 communicates with the first data store 280a through the first connection module 230a and the first association module 270a.

The first connection module 230a establishes 560 communications between the first association module 270a and a Second Association Module 270b. The second association module 270b is in communication with the second data store 280b. Preferably, communications are established between the first association module 270a and second association module 270b in response to a communication request from the control module 220 to access a second data store 280b. The control module 220 communicates with the second data store 280b through the first connection module 230a, the first association module 270a, and the second association module 270b. The control module 220 communicates indirectly with the first and second data stores 280a, 280b over a single direct communication channel with the first connection module 230a.

In one embodiment, the control module 220 establishes 580 communications between a first connection module 230a and a second connection module 230b. The second connection module 230b establishes communications with a third association module 270c, (see FIG. 4) the third association module 270c being in communication with the third data store 280c. The control module 220 may communicate with the third data store 280c through the first connection module 230a, the second connection module 230b, and the third association module 270c. The data store management method 500 allows a single control module 220 to communicate with a plurality of data stores 280 by communicating directly with the first connection module 230a.

Figure 6:
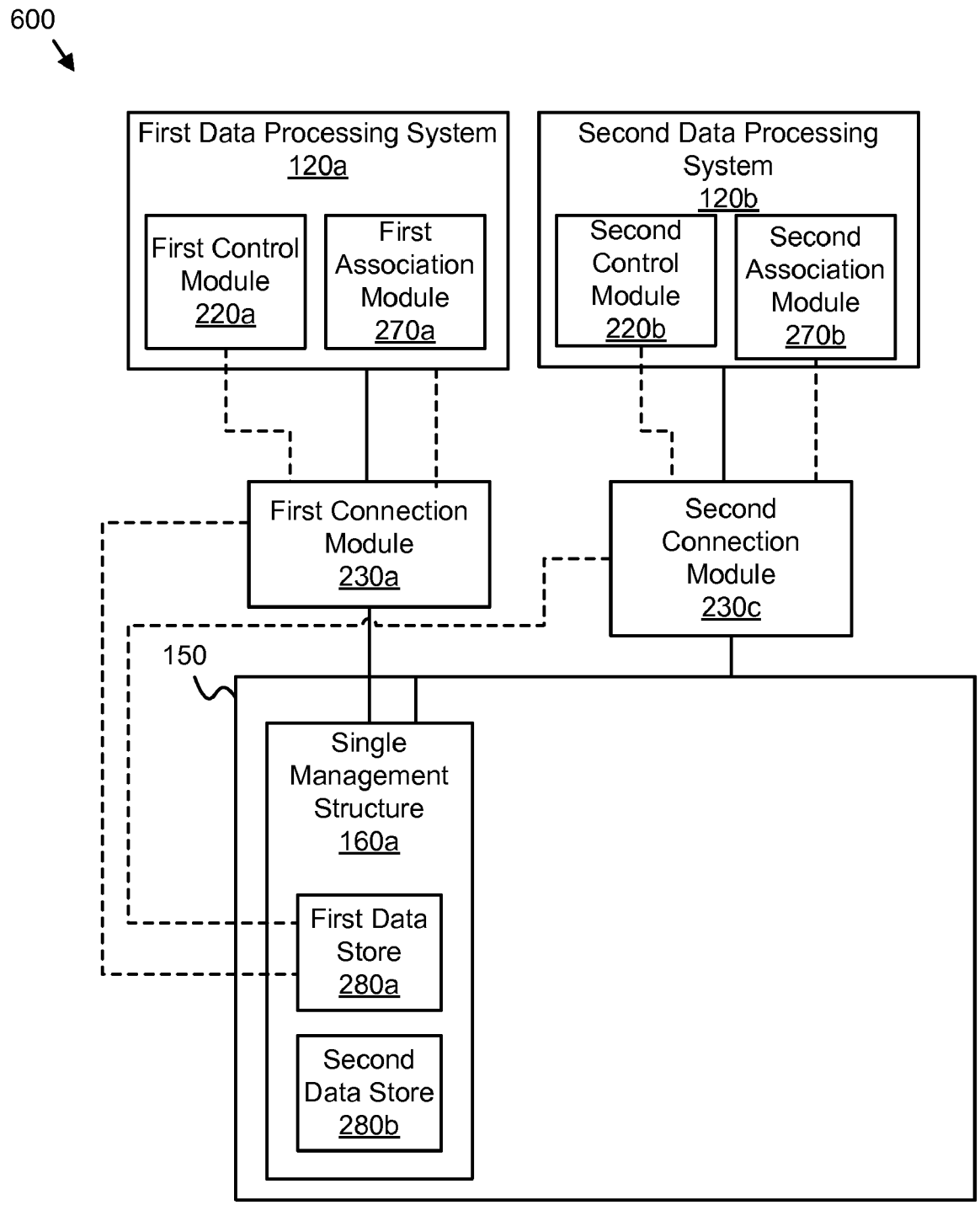
FIG. 6 is a schematic block diagram illustrating one embodiment of a multi-access management system in accordance with the present invention.

FIG. 6 is a schematic block diagram illustrating one embodiment of a multiple-access management system 600 in accordance with the present invention. In a certain embodiment, the coupling facility 150, the data processing systems 120 may comprise z/OS systems, and the data processing system 120 operating system may comprise z/OS XES systems, each manufactured by IBM of Armonk, N.Y.

The present invention allows a first data processing system 120a and a second data processing system 120b to each communicate with a first data store 280a of the single management structure 160a. Each data processing system 120 communicates with the first data store 280a through a control module 220, a connection module 230, and an association module 270. The first data processing system 120a communicates with the first data store 280a through the first control module 220a, the first connection module 230a, and the first association module 270a. The second data processing system 120b communicates with the first data store 280a through a second control module 220b, a second connection module 230c, and a second association module 270b.

The first control module 220a may establish or terminate communication with the first data store 280a without affecting the access of the second control module 220b to the first data store 280a. In addition, the first control module's 220a access to the first data store 280a is unaffected by the establishment or termination of communication between the second control module 220b and the first data store 280a.

The present invention allows a control module 220 to access a plurality of data stores 280 through communication with a first connection module 230, and through the first connection module 230 to one or more association modules 270 in communication with data stores 280. The present invention reduces the physical communication channels required to manage and access the plurality of data stores 280 and allows a single management structure 160 to include two or more data stores 280. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for managing data stores, the apparatus comprising:
   a first control module executed by a processor and configured to access a plurality of data stores in a single management structure of a mainframe coupling facility through a control block of a mainframe Cross System Operating System having a single physical communication channel limiting the first control module to communication with a single connection module, the single management structure comprising a cache structure within the coupling facility, each data store configured to communicate with a mainframe data processing system through a single physical communication channel;
   a first connection module executed by a processor and configured to communicate with the first control module and the plurality of data stores wherein the first connection module comprises a single physical connection from the first control module to the first connection module and then to the coupling facility;
   a first association module executed by a processor and configured to communicate with the first connection module and a first data store wherein the first association module comprises a linked array mapping data addresses into the first data store, and wherein the first control module accesses the first data store exclusively through a single physical connection, the first connection module directly physically connected exclusively to the first association module; and
   a second association module executed by a processor and configured to communicate with the first association module and a second data store, wherein the first control module accesses the second data store exclusively through the first connection module, the first association module, and the second association module in a series connection.

2. The apparatus of claim 1, wherein the coupling facility comprises a plurality of single management structures.

3. The apparatus of claim 1, wherein the first control module comprises a first mainframe data processing system and wherein the first mainframe data processing system accesses the first and second data stores through the first control module.

4. The apparatus of claim 3, further comprising a second mainframe data processing system in communication with the first data store through a second control module, a second connection module, and a third association module.

5. The apparatus of claim 1, wherein the first connection module is in communication with a second connection module, the second connection module in communication with a third association module and in communication with a third data store, and wherein the first control module accesses the third data store through the first connection module, the second connection module, and the third association module.

6. A computer program product comprising machine-readable instructions stored on a storage device and executable by a processor to perform operations, the operations comprising:
   establishing communications between a first control module and a first connection module, wherein the first control module is configured to access a plurality of data stores in a single management structure of a mainframe coupling facility through a control block of a mainframe Cross System Operating System having a single physical communication channel limiting the first control module to communication with a single connection module, the single management structure comprising a cache structure within the coupling facility, each data store configured to communicate with a mainframe data processing system through a single physical communication channel;

establishing communications between the first connection module and a first association module in communication with a first data store of a plurality of data stores of the single management structure wherein the first connection module comprises a single physical connection from the first control module, to the first connection module, and then to the coupling facility and wherein the first association module comprises a linked array mapping data addresses into the first data store, and the first control module accesses the first data store exclusively through a single physical connection, the first connection module directly physically connected exclusively to the first association module; and establishing communications between the first association module and a second association module in communication with a second data store, wherein the first control module accesses the second data store exclusively through the first connection module, the first association module, and the second association module in a series connection.

7. The computer program product of claim 6, wherein the first control module comprises a first data processing system and wherein the first data processing system accesses the first and second data stores through the first control module.

8. The computer program product of claim 6, wherein the instructions further comprise establishing communications between a second data processing system and the first data store through a second control module, a second connection module, and a third association module.

9. The computer program product of claim 6, wherein the instructions further comprise establishing communications between the first connection module and a second connection module, the second connection module in communication with a third association module and in communication with a third data store, wherein the first control module accesses the third data store through the first connection module, the second connection module, and the third association module.

10. A system for managing data stores, the system comprising:
    a mainframe coupling facility comprising a plurality of data stores;
    a first connection module, the first connection module executed by a processor and configured to communicate with a first control module and the plurality of data stores wherein the first connection module comprises a single physical connection from the first control module, to the first connection module, and then to the coupling facility;
    a data processing system comprising:
        a first control module executed by a processor and configured to access the plurality of data stores in a single management structure of the mainframe coupling facility through a control block of a mainframe Cross System Operating System having a single physical communication channel limiting the first control module to communication with a single connection module, the single management structure comprising a cache structure within the coupling facility, each data store configured to communicate with the mainframe data processing system through a single physical communication channel;
        a first association module executed by a processor and configured to communicate with the first connection module and a first data store wherein the first association module comprises a linked array mapping data addresses into the first data store, and wherein the first control module accesses the first data store exclusively through a single physical connection, the first connection module directly physically connected exclusively to the first association module; and
        a second association module executed by a processor and configured to communicate with the first association module and a second data store, wherein the first control module accesses the second data store exclusively through a logical connection that links the first control module, the first connection module, the first association module, and the second association module in a series.

11. The system of claim 10, wherein the mainframe coupling facility comprises a plurality of single management structures.

12. The system of claim 10, wherein the first control module comprises a first mainframe data processing system and wherein the first mainframe data processing system accesses the first and second data stores through the first control module.

13. The system of claim 12, further comprising a second mainframe data processing system in communication with the first data store through a second control module, a second connection module, and a third association module.

14. The system of claim 10, wherein the first connection module is in communication with a second connection module, the second connection module in communication with a third association module and in communication with a third data store, and wherein the first control module accesses the third data store through the first connection module, the second connection module, and the third association module.

* * * * *